Aug. 18, 1942.     R. PONTING     2,293,076
APPARATUS FOR INCREASING OR REDUCING FLUID PRESSURE
Filed Jan. 17, 1940     2 Sheets-Sheet 2

Inventor
Ralph Ponting
by Wilkinson & Mawhinney
Attorneys.

Patented Aug. 18, 1942

2,293,076

UNITED STATES PATENT OFFICE 2,293,076

APPARATUS FOR INCREASING OR REDUCING FLUID PRESSURE

Ralph Ponting, Bristol, England, assignor to The Bristol Aeroplane Company Limited, Bristol, England, a British company Application January 17, 1940, Serial No. 314,357
In Great Britain January 5, 1939

7 Claims. (Cl. 103—49)

This invention relates to apparatus for increasing or reducing fluid pressure and may be applied to apparatus for boosting the pressure of liquid in a hydraulic power-transmission system.

The apparatus, according to the invention, comprises two or more motor-pistons, each mechanically connected to a pump-plunger, a control-valve for the cylinder of each motor-piston and an operative connection between each motor-piston and the control-valve of another motor-piston such that one motor-piston is set in motion when another motor-piston reaches the end of its stroke.

The motor-pistons (hereinafter, for brevity, referred to as "the pistons") are preferably either arranged in pairs coupled together or else each is a double-acting piston. Each piston may actuate the control-valve of another piston through lost motion mechanism, whereby the valve remains in the position to which it has been moved until the piston which actuates it is at or near the end of its stroke.

Each pump-plunger is preferably constituted by an integrally formed extension from one of the pistons. Where the fluid which actuates the pistons is the same as that delivered by the pumps, and where the apparatus operates to raise its pressure, the cylinder of each pump-plunger may communicate with the cylinder of the piston by a conduit which is open during the intake stroke of the plunger but closed by an automatic valve during the delivery stroke of the plunger. Thus, the cylinder of the plunger is charged with fluid from the cylinder of the piston.

In one form of the invention, each controlling valve is a sleeve-like member surrounding the rod of the piston and spaced away therefrom. Thus, the piston-rod may extend through the valve and be formed integrally with one of the pump-plungers beyond the valve. Alternatively, the valve may be a piston-valve slidable in a separate valve-chest and operated by the piston through mechanical interlinkage.

Figure 1:
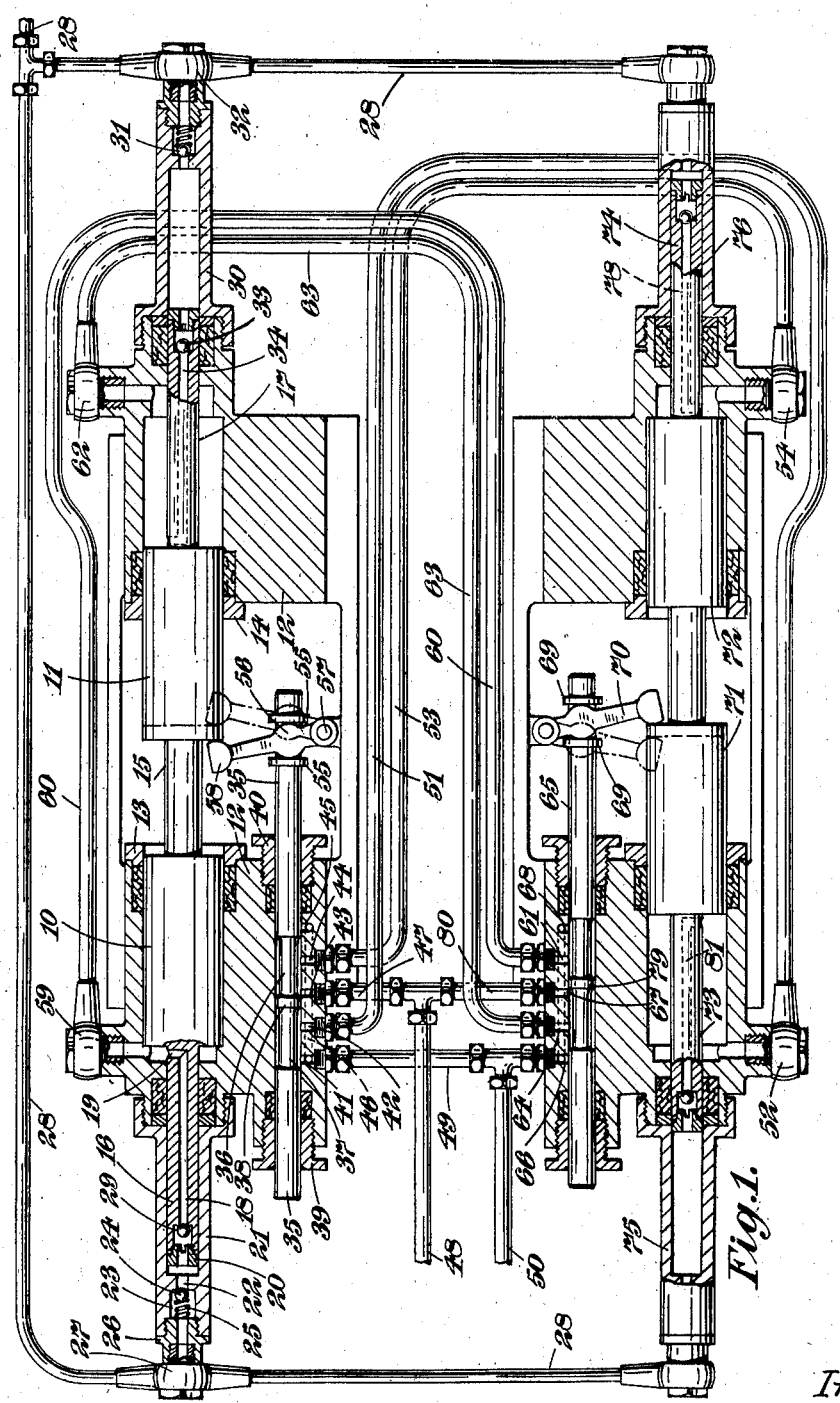
Figure 2:
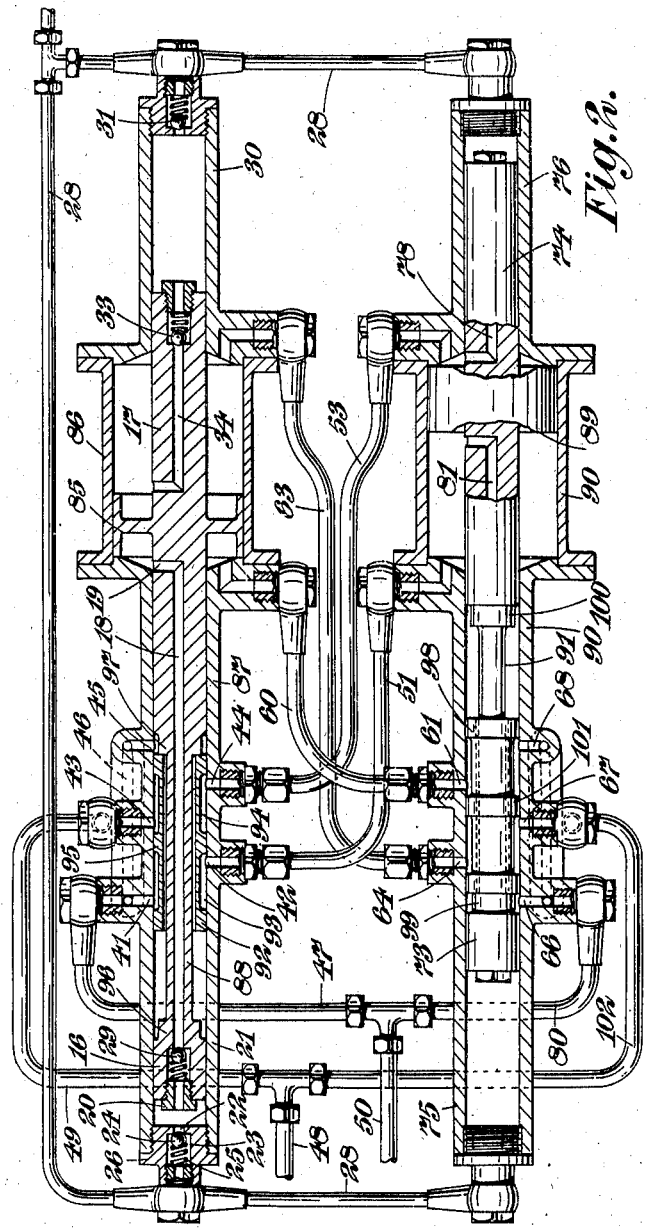

Two specific embodiments will now be described, by way of example, with reference to the accompanying drawings, in which, Figure 1 shows, partly in section, apparatus for supplying oil under a comparatively high pressure, such as 4000 lbs. per square inch, from a source of oil at a substantially lower pressure such as 600 lbs. per square inch, and Figure 2 shows an alternative form of the apparatus.

As shown first in Figure 1, the apparatus comprises two motor-cum-pump units arranged side by side. One of these units comprises two motor-pistons 10, 11, each of which is a single-acting piston sliding in a cylinder formed in a casting 12. Each cylinder is packed by means of a gland 13, 14 and the pistons are connected together by an intermediate piston-rod 15. Projecting from the left-hand end of the piston 10 is a pump-plunger 16 and from the right-hand end of the piston 11 a similar pump-plunger 17. The plunger 16 is formed internally with a bore 18 which opens through a port 19 into the interior of the cylinder of the piston 10. At its left-hand end the conduit forms a seat for a ball-valve 29 held in place by a bush 20 screw-threaded into the end of the plunger. The plunger slides in a cylinder 21 the end of which communicates through a port 22 with a space 23 which houses a ball 24 spring-pressed by a spring 25 into a position in which it closes the port 22. The end of the cylinder beyond the space 23 is connected by a cap 26 and union 27 to the high-pressure delivery pipe 28. The ball 24 constitutes a non-return valve which permits oil to be discharged by the plunger 16 into the pipe 28 to prevent oil from returning to the cylinder of the plunger during its intake stroke. The other pump-plunger 17 is exactly similar and slides in a cylinder 30 which communicates through a non-return valve 31 and union 32 with the same high-pressure delivery pipe 28. The plunger 17 houses an automatic ball-valve 33 similar to the valve 29 which controls the internal conduit 34 which, like the conduit 18, opens at its inner end into the interior of the cylinder in which the piston 11 slides.

Formed in the casting 12 alongside the piston 10, is a piston-valve comprising a rod 35 and reduced portions 36 and 37, separated by an unreduced land 38. The valve-chest is formed with glands 39, 40 at the ends to seal the joint around the valve-rod 35.

The wall of the valve-chest is formed with five ports 41, 42, 43, 44, 45, the ports 41 and 45 being connected together by a transfer-passage 46. Oil under a comparatively low pressure such as 600 lbs. per square inch is supplied to the port 43 through a pipe 47, which branches from a supply pipe 48. The ports 41 and 45 are drain ports and are connected to a pipe 49 which leads into a return-pipe 50. The port 42 communicates by a pipe 51 with a union 52 of the other motor-unit and the port 44 communicates by the pipe 53 with the union 54. Near its right-hand end the valve-rod 35 is formed with collars 55 to engage a forked lever 56 which is fulcrumed at 57 to the casting 12. The free end of the lever 58 constitutes a tappet for engagement by the outer faces of the pistons 10 and 11. When the pistons 10 and 11 are in their extreme left-hand position, as shown in Figure 1, the tappet 58 is in its left-hand position so that the lever 56 occupies the position shown in full lines so that the valve-rod 35 is in a position in which the land 38 lies between the ports 43 and 42. Thus, pressure liquid from the pipe 47 can flow through the port 43, to the port 44, whereas liquid from the pipe 51 can flow through the port 42 to the port 41 and away through the pipe 50. When the pistons 10 and 11 travel to the right, as shown in Figure 1, the tappet is engaged by the piston 10 near the end of its travel and is thereby moved into the position shown in chain lines, whereby the valve-rod 35 is shifted to a position in which the land 38 lies between the ports 43 and 44. In this position, the ports 42 and 43 are in communication with one another and the ports 44 and 45 are in communication with one another.

Liquid is admitted to the cylinder of the piston 10 through a union 59 to which a pipe 60 is connected. The pipe 60 leads from the port 61 in the valve-chest of the other motor-cum-pump unit. Similarly, oil is admitted to the cylinder of the piston 11 through a union 62 to which a pipe 63 leads oil from the port 64 in the valve-chest. The valve for the lower unit comprises a valve-rod 65, ports 66, 64, 67, 61, 68, collars 69, actuating lever 70 all of which are identically similar to the corresponding parts of the valve mechanism of the upper unit. The motor-pistons 71, 72 of the lower unit are exactly similar to the pistons 10 and 11. The piston 71 is integrally formed with a pump-plunger 73 and the piston 72 with a pump-plunger 74. The pump-plungers 16, 17, 73, 74 are all identically similar. Also the cylinder 75 of the plunger 73 and the cylinder 76 of the plunger 74 house non-return valves through which liquid is discharged into the high-pressure delivery pipe 28, the valves being identically similar to the delivery valves 24 and 31 already described.

The manner in which the apparatus operates will now be described. Oil at a comparatively low pressure is admitted from the pipes 48 and 47 to the port 43 from which it flows through the port 44 along the pipe 53 to the cylinder of the motor-piston 72. At the same time, the cylinder of the piston 71 is open, through the pipe 51, the port 42 and the port 41, to the drain 50. The two pistons 71 and 72 therefore move from the position shown towards the left. The consequence of this movement is that the pump-plunger 73 displaces liquid from the cylinder 75 and delivers it past the non-return valve into the delivery pipe 28. Simultaneously the ball-valve in the plunger 74 opens whereby some of the oil admitted to the cylinder of the piston 72 flows along the conduit 78 in the plunger 74 to charge the cylinder 76 with oil. Towards the end of the movement referred to, the face of the piston 72 engages the tappet of the lever 70 whereby the lever is rocked into the position shown in chain lines. Consequently the valve-rod 65 is moved into the position in which the land 79 lies between the ports 64 and 67. Thus, oil from the pipe 48 can flow along the pipe 80, through the port 67 to the port 61, along the pipe 60 through the union 59 into the cylinder of the piston 10. Simultaneously, the ports 64 and 66 are connected together so that the cylinder of the piston 11 communicates through the pipe 63 with the drain 50. Thus, the two pistons 10 and 11 begin to move towards the right. The result of this movement is that oil is delivered at high pressure by the plunger 17 from the cylinder 30 through the non-return valve 31 into the high-pressure delivery pipe 28. Also some of the oil from the pipe 60 flows through the conduit 18, past the ball-valve 29 into the space left behind by the plunger 16. Near the end of the movement of the pistons 10 and 11 towards the right, the pipe 58 is engaged by the piston 10, and moved into the position shown in chain lines. Consequently the valve-rod 35 is moved into a position in which the land 38 lies between the ports 44 and 43. Oil from the pipe 58 can therefore now flow through the ports 43 and 42 into the pipe 51 and oil from the pipe 53 can flow through the ports 44 and 45 and along the transfer-passage 46 into the pipe 50. Consequently, the pistons 71 and 72 are moved towards the right, oil is delivered at high pressure by the plunger 74 to the delivery pipe 28 and the cylinder 75 is charged by the movement of the piston 73 with oil which flows through the conduit 81 in the plunger. At the end of the movement of the pistons 71 and 72 towards the right, the lever 71 is moved in the position shown in full lines whereby the valve 65 is actuated so as to admit oil under pressure to the cylinder of the piston 11 whereby the pistons 10 and 11 return to the position shown in full lines. The two motor-cum-pump units thus operate alternately, and oil under high pressure is continuously discharged by one or other of the pump-plungers into the delivery pipe 28. Each pair of motor-pistons actuates the valve controlling the other pair during the last part of its movement.

The valves are preferably so mounted in the valve-chest, for example, by the provision of piston-rings (not shown) that there is a frictional force opposing their movement. Thus, each valve is restrained against movement except when the lever 56 or 70 is positively engaged by one of the piston faces.

In the arrangement of Figure 1 the pistons of each motor-cum-pump unit are separate and oppositely directed and the valve for each unit is housed in a separate valve-chest, the valve being driven by the pistons through a mechanical system, as above explained. In the alternative arrangement of Figure 2, the valve of each unit is housed in the same cylindrical casing as the piston and pump-plungers, a single double-acting piston being used for each unit. The parts of Figure 2 which are similar to or equivalent to corresponding parts in Figure 1 are denoted by the same reference numerals. Referring to the upper part of Figure 2 the motor-piston 85 which slides in the cylinder 86, is formed integrally on one side with the pump-plunger 17 and on the other side with the pump-plunger 16. The plunger 16 is separated from the piston by a stem 88 of reduced diameter. The cylinder 21 in which the pump-plunger 16 reciprocates is constituted by the end of a tubular extension 87 from the motor cylinder. The pump-cylinder 30 is formed integrally with the other cover of the cylinder 86. The pump-plunger 16 is equipped with an automatic ball-valve 29 controlling the conduit 18 leading to the port 19 within the cylinder 86 and the end of the pump-cylinder 21 is equipped with a non-return valve 24 as in the case of Figure 1. The various ball-valves 24, 29, 31 etc. may or may not be provided with light springs to hold them on their seats. The pump-plunger 73 at the left-hand end of the lower unit is identical in construction with the pump-plunger 16 and is therefore shown in outside elevation. Similarly, the pump-plunger 17 is formed with a conduit 34 leading from the interior of the cylinder 86, the conduit being controlled by the automatic ball-valve 33. The discharge end of the cylinder 30 is controlled by the ball-valve 31 as in the case of Figure 1. The pump-plunger 74 and the pump-cylinder 76 of the lower unit are identical with those of the upper unit.

The cylindrical portion 87 between the pump-cylinder 21 and the motor-cylinder 86 constitutes a valve-chest and is formed with ports 41, 43, 45, 42 and 44 in the same manner as the valve-chest of Figure 1. Oil under low pressure is admitted from the pipe 48 to the port 43 and is discharged either from the port 41 or the port 45 (through the transfer-passage 46) through the pipe 47 to the drain 50. Similarly, the ports 66, 64, 67, 61 and 68 of the lower unit are arranged in the same manner as the corresponding ports in the lower unit of Figure 1.

The ports in the valve-chest of the upper unit are controlled by a valve in the form of a sleeve 92 spaced away from the stem 88 and having two grooves 93, 94, separated by an intermediate land 95. The reduced portion 88 terminates at its left-hand end in a shoulder 96 adapted to abut the left-hand end of the sleeve 92 when the motor-piston 85 reaches a point near the end of its travel towards the right. The right-hand end of the stem 88 terminates in a shoulder 97 which, as shown in Figure 2, abuts against the right-hand end of the sleeve 92 at the end of the travel of the motor-piston towards the left. The valve 92 is provided with piston-rings or the like (not shown) to make frictional engagement with the valve-chest so that the valve stays in the position to which it has been moved by the shoulder 96 or 97. In the lower unit the valve-sleeve 98, which is exactly similar to the valve 92, surrounds the reduced stem 91 and is controlled by the shoulders 99 and 100, at the left and right-hand ends respectively of the stem 91.

The apparatus shown in Figure 2 operates as follows: With the parts in the positions shown, oil at a low pressure reaches the port 43 through the pipe 49 and flows around the groove 94 in the sleeve 92, to the port 44. From this port the oil flows along the pipe 53 to the right-hand end of the motor-cylinder 90. Consequently, the piston 89 is driven from the position shown towards the left. Simultaneously, oil from the left-hand side of the piston 89 is discharged from the cylinder 90 along the pipe 51, through the port 42, around the groove 93, through the port 41, along the pipe 47 to the drain 50. Movement of the pump-plunger 73 towards the left discharges oil from the cylinder 75 through the non-return valve (not shown) into the high-pressure delivery pipe 28. Simultaneously, the cylinder 76 of the pump-plunger 74 is charged with oil which flows through the conduit 78 past the automatic valve (not shown) in the end of the plunger. During the major part of this movement of the piston 89, the reduced stem 91 moves idly through the sleeve 98 which therefore remains in the position shown. However, towards the end of the movement of the motor-piston the shoulder 100 engages the right-hand end of the sleeve 98 and shifts it from the position shown into the position in which the land 101 lies on the left-hand side of the port 67, so that oil from the pipe 48 can flow through the pipe 102 into the port 61; from the port 61 the oil flows along the pipe 60 into the left-hand end of the motor-cylinder 86 in the upper unit. Simultaneously, the pipe 63 is connected through the port 64 to the port 66 whereby oil discharged from the right-hand end of the cylinder 86 can flow through the pipe 80 to the drain 50. The motor-piston 85 therefore begins to travel towards the right. During such movement oil is discharged from the pump-cylinder 30 past the non-return valve 31 at high pressure into the delivery pipe 28, and the pump-cylinder 21 is charged with oil from the left-hand end of the cylinder 86, the oil flowing through the port 19 and along the conduit 18 past the automatic valve 29. As the piston 85 approaches the end of its stroke the shoulder 96 engages the left-hand end of the sleeve 92 which is moved to the right to a position in which the land 95 lies between the ports 43 and 44. Thus, oil from the pipe 48 can flow through the pipe 49, the port 43, around the groove 93 in the valve, through the port 42, along the pipe 51 to the left-hand end of the cylinder 90. Also oil discharged from the right-hand end of the cylinder 90 can flow along the pipe 53 through the port 44 around the groove 94 through the port 45 along the transfer-passage 46 and along the pipe 47 to the drain 50. The piston 89 therefore moves towards the right until it reaches the position shown in Figure 2. Towards the end of this movement, the valve 98 is shifted by the shoulder 99 to the position shown whereby oil under pressure is admitted to the right-hand end of the cylinder 86 and the piston 85 is moved to the left into the position shown in Figure 2.

It will thus be seen that the pistons 85 and 89 move alternately in their cylinders and that as each approaches the end of its stroke it moves the valve so as to start the other piston on another stroke. Thus, one of the pump-plungers is always in motion and performing a delivery stroke whereby oil is constantly being delivered under high pressure into the delivery pipe 28.

An advantage of the arrangement of Figure 2 is that the hydraulic system is completely closed and no packing of any kind is required. Any slight leakage between one of the cylinders and another is not a serious disadvantage.

It will be understood that the relative diameters of the motor-piston and the pump-plunger are determined according to the pressure-increase required. Although the invention has been described as applied to apparatus for increasing the pressure of the fluid, it could be used, with suitable modification, for the purpose of circulating a large quantity of fluid at a comparatively low pressure by means of a limited quantity of fluid at a substantially higher pressure. In this event, the motor-piston of each unit would be of smaller diameter than the pump-plungers.

An advantage of the invention is that the reciprocation of the moving parts is automatically arrested when the demand for high pressure fluid ceases. Thus, when a valve is closed in the system supplied by the pipe 28 the pressure in the cylinder of the pump which at that time is performing its delivery stroke immediately rises to such a value as will balance the force exerted by the low pressure fluid upon the motor-piston, so that the piston and plunger will come to rest. Immediately the said valve is opened the movement of the parts continues in the manner which has already been described.

I claim:

1. An apparatus for increasing or reducing fluid pressure, comprising oppositely moving pistons having pump plungers extending therefrom, cylinders for said pistons and plungers, control valves surrounding said plungers and movable therewith, said control valves controlling movement of the pistons whereby one of said pistons is set in motion when another piston has reached the end of its stroke.

2. An apparatus for increasing or reducing fluid pressure comprising a plurality of pistons having cylinders for movement therein, a pump plunger for each of said pistons, means for connecting each of said pistons to each of said plungers, a control valve for each of said pistons and cylinders, operative connecting means between each piston and the control valve of another piston, each operative connecting means setting in motion one of said pistons when another piston has reached the end of its stroke, cylinders for said pump plungers, a conduit leading from the piston cylinders to the pump plunger cylinder, said conduit being open during the intake stroke of the plunger, and an automatic valve to close said conduit during the delivery stroke of the plunger and charging said plunger cylinder with fluid from the piston cylinder.

3. An apparatus for increasing or reducing fluid pressure comprising a plurality of pistons having cylinders for movement therein, a pump plunger for each of said pistons, cylinders for said pump plungers, means for connecting each of said pistons to each of said plungers, a control valve for each of said pistons and cylinders, and operative connecting means between each piston and the control valve of another piston, each operative connecting means setting in motion one of said pistons when another piston has reached the end of its stroke, each of said valves comprising a sleeve member surrounding the rod of said piston, and actuated by enlargements of said rod.

4. An apparatus for increasing or reducing fluid pressure comprising a plurality of pistons having cylinders for movement therein, a pump plunger connected to each of said pistons, cylinders for said pump plungers, a control valve for the cylinder of each piston, and operative means between each piston and the control valve of another piston to set in motion the control valve of one of said pistons when another piston approaches the end of its stroke wherein, when arranged in pairs, the pistons of one pair move oppositely to the pistons of another pair, said pump plungers being integral with and extending from said pistons.

5. An apparatus for increasing or reducing fluid pressure comprising a plurality of pistons having cylinders for movement therein, said pistons arranged in pairs wherein the pistons of one pair move oppositely to the pistons of another pair, a pump plunger connected to each of said pistons, cylinders for said pump plungers, a control valve for the cylinder of each piston, and operative connecting means between each piston and the control valve of another piston wherein each of said pistons is double acting, said pump plungers being integral with and extending from said pistons.

6. An improved apparatus for increasing or reducing fluid pressure comprising a plurality of pistons having cylinders for movement therein, a pump plunger for each of said pistons, cylinders for said pump plungers, and means for connecting each of said pistons to each of said plungers, a control valve for each of said pistons and cylinders and operative connecting means between each piston and the control valve of another piston, each operative connecting means being inactive during the greater portion of the stroke of its corresponding piston and being acted upon near the end of the stroke of said piston for setting in motion the control valve of one of said pistons when another piston has reached the end of its stroke, said pistons being arranged in pairs wherein the pistons of one pair move oppositely to the pistons of another pair.

7. An apparatus for increasing or reducing fluid pressure comprising a plurality of pairs of pistons having cylinders for movement therein, said pistons of one pair being coupled together to move oppositely to the pistons of the other pair, a pump plunger mechanically connected to each piston, cylinders for said pump plungers, a control valve for the cylinder of each piston, and operative connecting means between each piston and the control valve of another piston, said operative connection being inactive during the greater portion of the stroke of its corresponding piston and being acted upon near the end of the stroke of said piston for setting in motion one pair of pistons when another pair of pistons approaches the end of their stroke.

RALPH PONTING.